(12) United States Patent
Matsumoto et al.

(10) Patent No.: US 12,385,817 B2
(45) Date of Patent: Aug. 12, 2025

(54) IMPACT TEST DEVICE

(71) Applicant: KOKUSAI KEISOKUKI KABUSHIKI KAISHA, Tama (JP)

(72) Inventors: Sigeru Matsumoto, Tokyo (JP); Hiroshi Miyashita, Tokyo (JP); Kazuhiro Murauchi, Tokyo (JP); Kiyoaki Haneishi, Tokyo (JP)

(73) Assignee: KOKUSAI KEISOKUKI KABUSHIKI KAISHA, Tama (JP)

( * ) Notice: Subject to any disclaimer, the term of this patent is extended or adjusted under 35 U.S.C. 154(b) by 308 days.

(21) Appl. No.: 17/836,680

(22) Filed: Jun. 9, 2022

(65) Prior Publication Data

US 2022/0299412 A1   Sep. 22, 2022

Related U.S. Application Data

(63) Continuation-in-part of application No. PCT/JP2020/047302, filed on Dec. 17, 2020.

(30) Foreign Application Priority Data

Dec. 27, 2019   (JP) .................................. 2019-237689

(51) Int. Cl.
*G01M 7/08*   (2006.01)
*G01N 3/30*   (2006.01)

(52) U.S. Cl.
CPC .................. *G01N 3/30* (2013.01); *G01M 7/08* (2013.01)

(58) Field of Classification Search
None
See application file for complete search history.

(56) References Cited

U.S. PATENT DOCUMENTS

| 5,485,758 | A | * | 1/1996 | Brown | G01M 17/0078 |
| | | | | | 73/12.09 |
| 5,872,321 | A | * | 2/1999 | Yannaccone | G01M 7/08 |
| | | | | | 73/865.9 |
| 2007/0251295 | A1 | * | 11/2007 | Rieser | G01M 17/0078 |
| | | | | | 73/12.07 |
| 2013/0283902 | A1 | * | 10/2013 | Kobayashi | G01M 17/0078 |
| | | | | | 73/118.01 |
| 2016/0258837 | A1 | * | 9/2016 | Rastegar | G01N 3/307 |
| 2019/0383706 | A1 | | 12/2019 | Matsumoto et al. | |

FOREIGN PATENT DOCUMENTS

| CN | 204705559 U | 10/2015 |
| CN | 206095836 U | 4/2017 |
| CN | 206311294 U * | 7/2017 |

(Continued)

OTHER PUBLICATIONS

Mar. 16, 2021 International Search Report issued in Patent Application No. PCT/JP2020/047302.

*Primary Examiner* — Stephen D Meier
*Assistant Examiner* — Ruben C Parco, Jr.
(74) *Attorney, Agent, or Firm* — Oliff PLC

(57) ABSTRACT

An impact test device includes a base, a dolly capable of traveling with a test piece placed thereon, and a fall preventing structure configured to prevent the test piece from falling over. The fall preventing structure includes a first section independent of the dolly The first section is provided so as to be movable in a traveling direction of the dolly with respect to the base.

8 Claims, 9 Drawing Sheets

(56) References Cited

FOREIGN PATENT DOCUMENTS

| | | | |
|---|---|---|---|
| CN | 110366674 A | | 10/2019 |
| JP | H107-215246 A | | 8/1995 |
| JP | H10-104145 A | | 4/1998 |
| JP | 2005227011 A | * | 8/2005 |
| JP | 2012-083133 A | | 4/2012 |
| JP | 2019-035705 A | | 3/2019 |
| KR | 10-2010-0020281 A | | 2/2010 |
| WO | 2009/136459 A1 | | 11/2009 |
| WO | 2009/145012 A1 | | 12/2009 |
| WO | WO-2018159199 A1 | * | 9/2018 ............. B66F 9/063 |

\* cited by examiner

IMPACT TEST DEVICE

CROSS REFERENCE TO RELATED APPLICATIONS

This is a Continuation-in-Part of International Application No. PCT/JP2020/047302 filed on Dec. 17, 2020, which claims priority from Japanese Patent Application No. 2019-237689 filed on Dec. 27, 2019. The entire disclosures of the prior applications are incorporated herein by reference.

BACKGROUND

Technical Field

The present disclosure relates to an impact test device.

Related Art

An impact test device is used to evaluate strengths of products and the adequacies of packaging designs. A conventional impact test device is provided with a support plate that supports a test article in order to prevent the test article from falling over during the test. The support plate is installed to a traveling unit (an impact table) on which the test article is placed to be perpendicular to a traveling direction of the traveling unit.

SUMMARY

In the conventional impact test device described above, since the support plate is installed to the impact table, a weight of the impact table increases by a weight of the support plate. Furthermore, since the support plate having a large surface area is disposed perpendicular to the traveling direction of the impact table, a large wind pressure acts on the support plate when the impact table is traveling at a high speed. The increase in the weight of the impact table due to the installation of the support plate and the increase in the wind pressure the impact table receives during traveling (in other words, an increase in air resistance) cause power required to drive the impact table to increase, resulting in an increase in power consumption. In addition, due to the increase in power required to drive the impact table, a larger motor (i.e., a larger motor) may be required to drive the impact table and may result in problems of an increase in initial cost and an increase in size of the test device.

At least one aspect of the present disclosure is advantageous to reduce the increase in the power required to drive the impact table due to the introduction of a structure for preventing the test article from falling over.

According to aspects of the present disclosure, there is provided an impact test device including a dolly capable of traveling with a test piece placed thereon, and a fall preventing structure configured to prevent the test piece from falling over. The fall preventing structure includes a first section independent of the dolly. The first section is provided so as to be movable in a traveling direction of the dolly.

According to aspects of the present disclosure, there is further provided an impact test device including a dolly capable of traveling with a test piece placed thereon, and a fall preventing structure configured to prevent the test piece from falling over. The fall preventing structure includes second section installed on the dolly. The second section includes a plurality of columnar support erected on the dolly, and a linear member stretched over the plurality of columnar support.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, illustrative embodiments of the present disclosure will be described with reference to the drawings. In the following description, the same or corresponding numerals are assigned to the same or corresponding components, and redundant descriptions are herein omitted. In each drawing, in a case where a plurality of item whose numerals are in common are shown, the numeral is not necessarily assigned to all of the plurality of items, and assignment of the numeral to some of the plurality of item is appropriately omitted. Furthermore, in each drawing, some components are omitted or shown in cross sections for convenience of explanation.

First Embodiment

Figure 1:
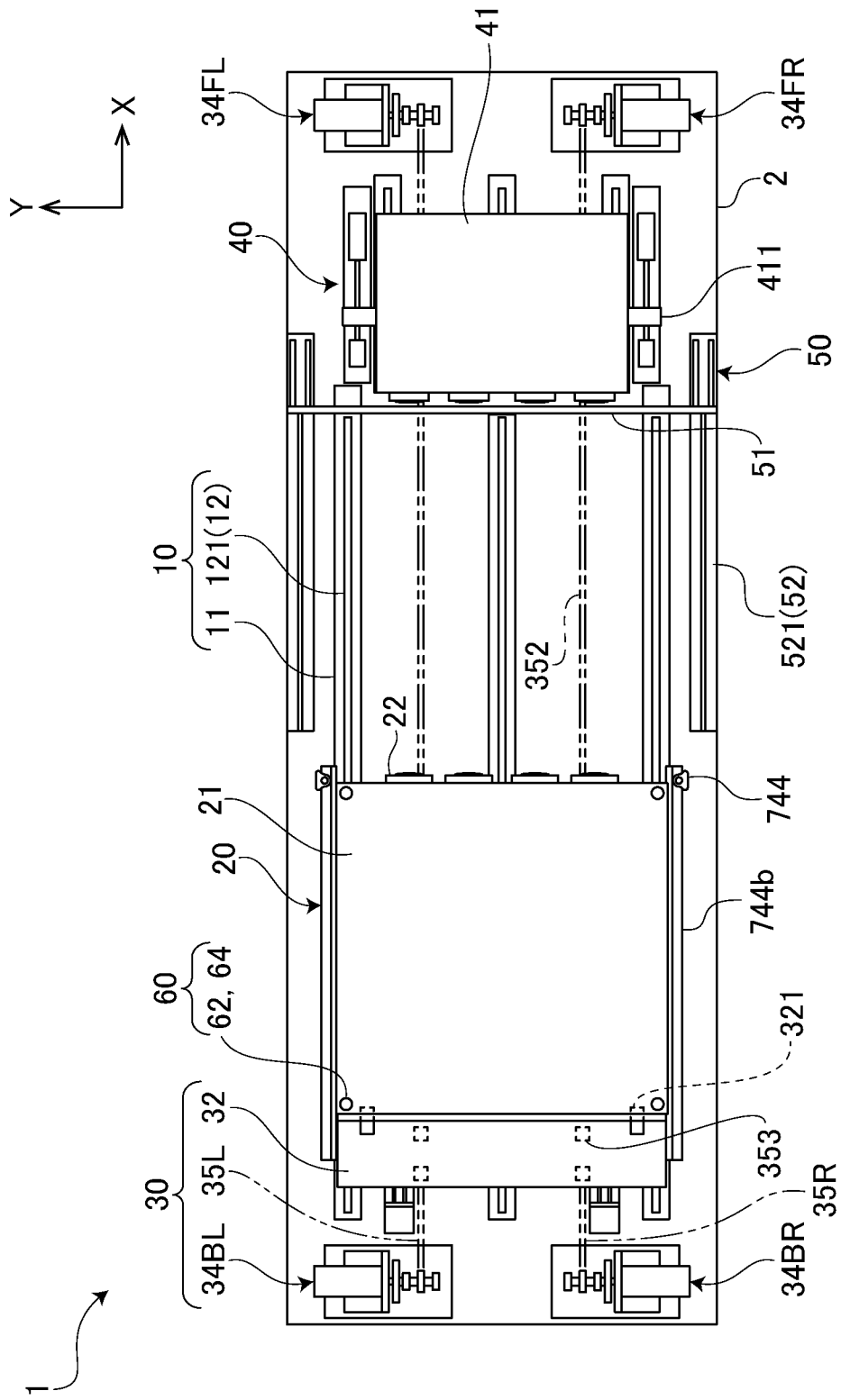
FIG. 1 is a plan view of an impact test device according to a first embodiment of the present disclosure.
Figure 2:
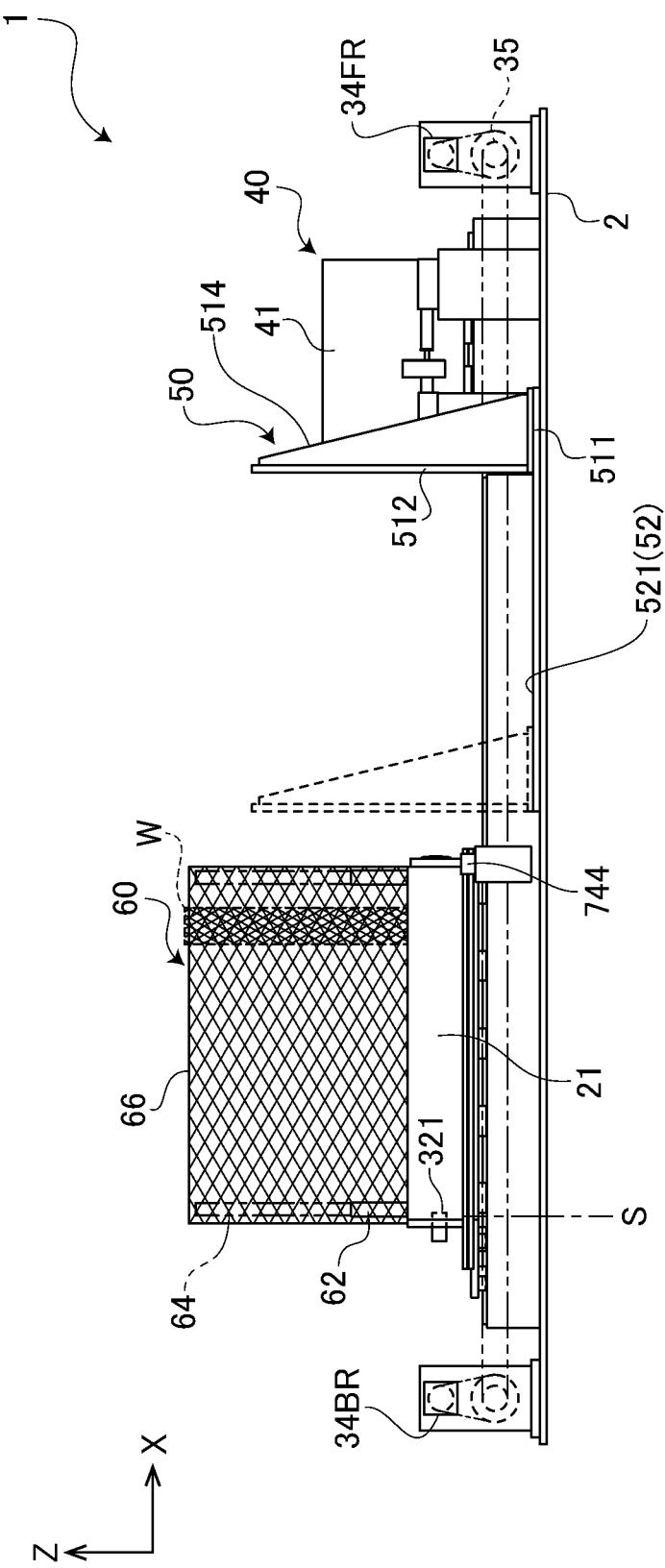
FIG. 2 is a side view of the impact test device according to the first embodiment of the present disclosure.
Figure 3:
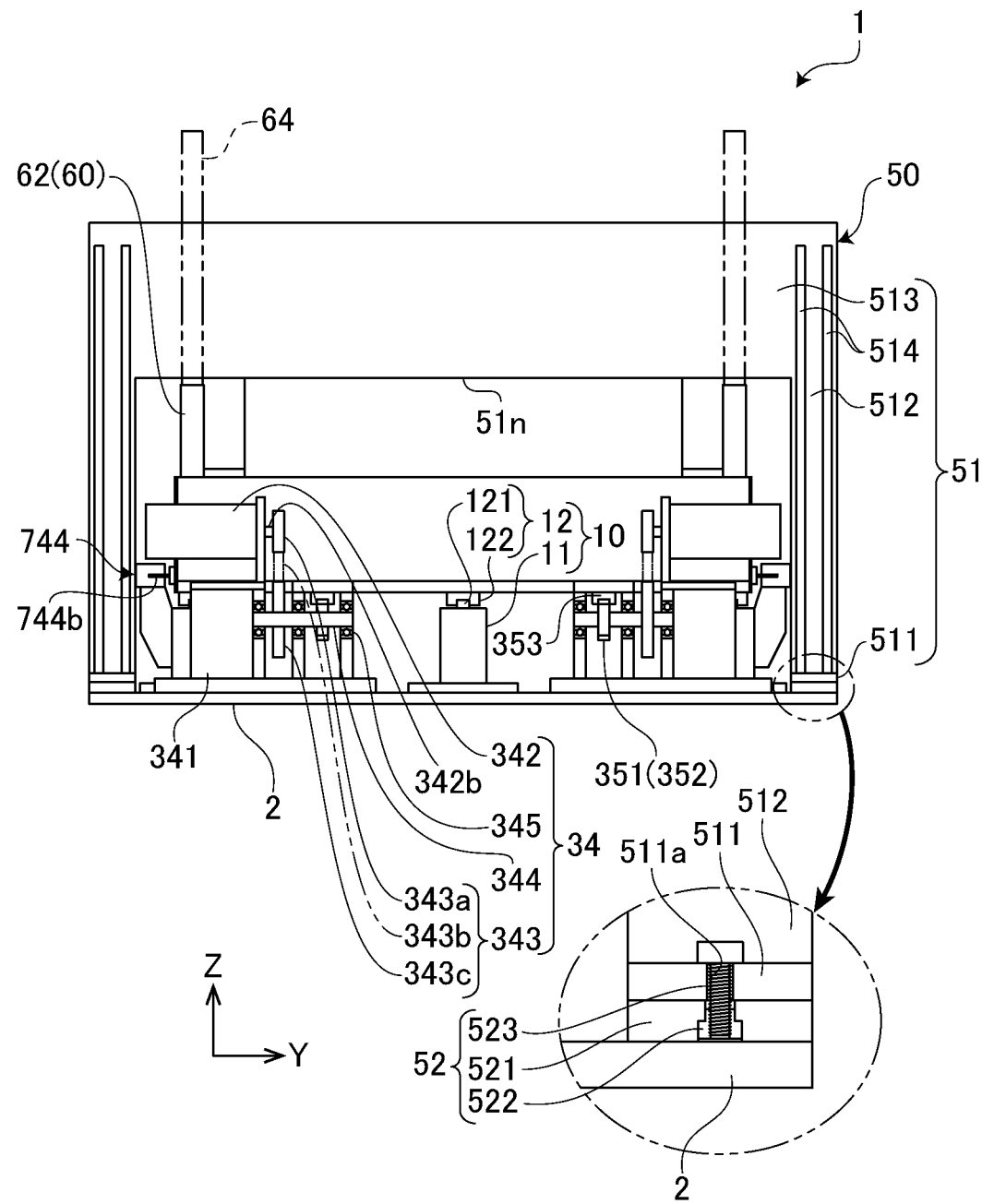
FIG. 3 is a front view of the impact test device according to the first embodiment of the present disclosure.
Figure 4:
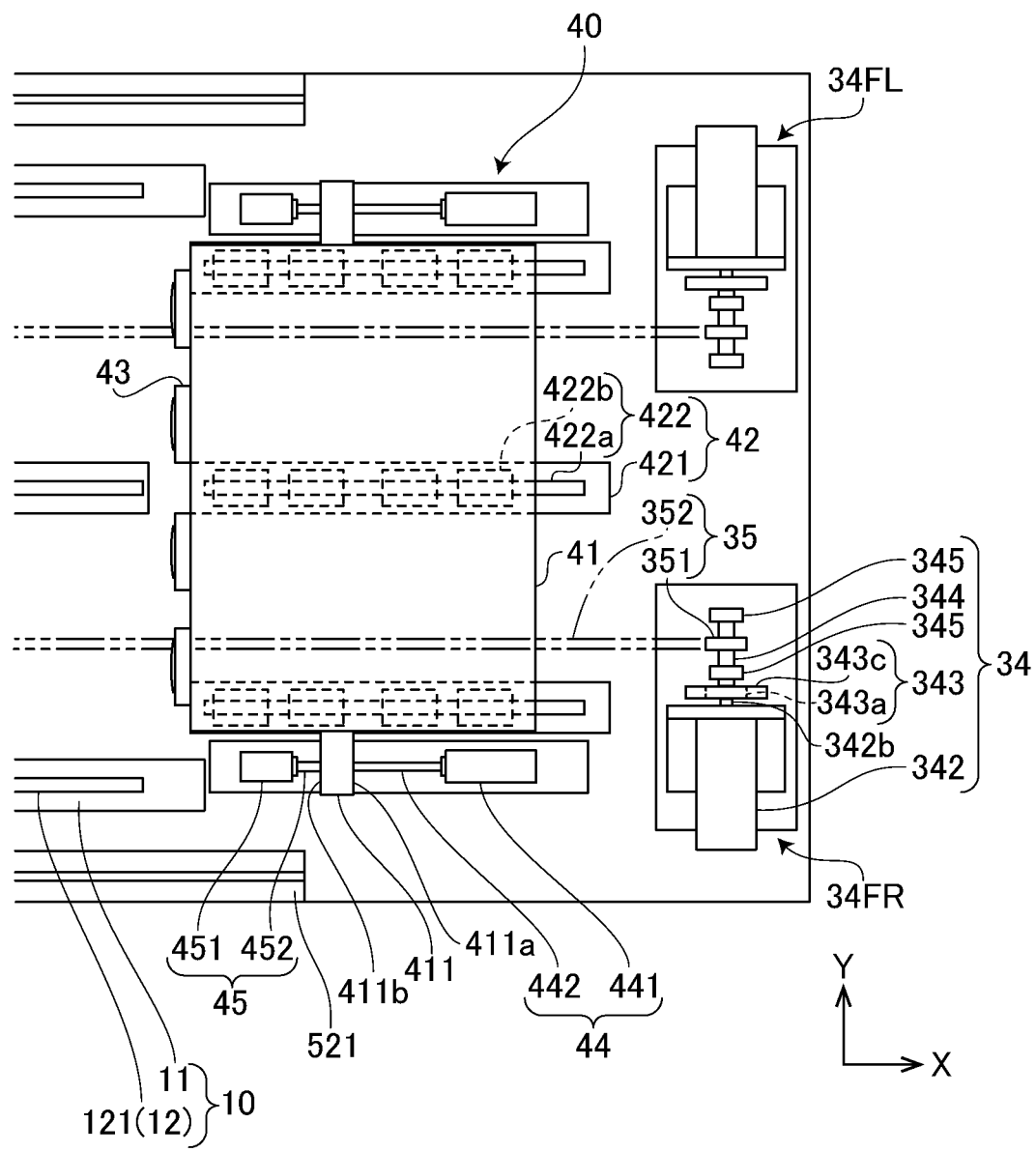
FIG. 4 is an enlarged plan view around an impact generating device of the first embodiment.
Figure 5:
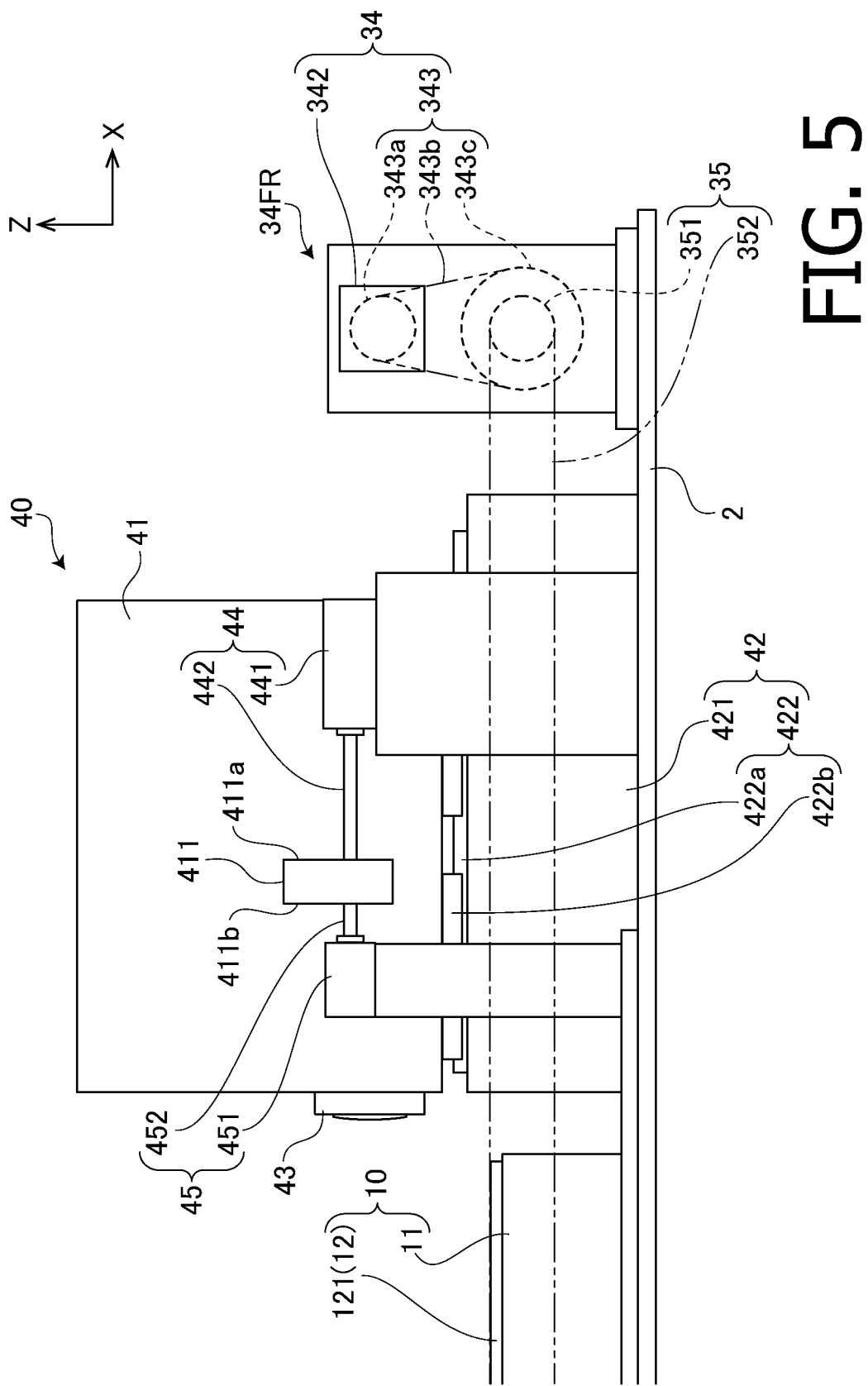
FIG. 5 is an enlarged side view around the impact generating device of the first embodiment.

FIGS. 1-3 are a plan view, a side view and a front view, in this order, of an impact test device 1 according to a first embodiment of the present disclosure, and FIG. 4 and FIG. 5 are an enlarged plan view and an enlarged side view, in this order, around a later-described impact generating device 40 of the impact test device 1.

In the following description, a direction from left to right in FIG. 1 is defined as an X-axis direction, a direction from bottom to top in FIG. 1 is defined as a Y-axis direction, and a direction perpendicular to the paper from the back side to the front side is defined as a Z-axis direction. The X-axis direction and the Y-axis direction are horizontal directions orthogonal to each other, and the Z-axis direction is a vertical direction. In addition, the X-axis positive direction is referred to as front, the X-axis negative direction is referred to as back, the Y-axis positive direction is referred to as left, and the Y-axis negative direction is referred to as right.

The impact test device 1 according to the first embodiment of the present disclosure, which will be described below, is configured to be able to perform two types of test methods: a conventional test method (hereinafter referred to as a "collision type test") in which an impact is applied to a test piece W by causing an impact table on which the test piece W is placed to collide with an impact waveform generating device, and a new test method (hereinafter referred to as a "non-collision type test") in which an impact is applied to the test piece W by transmitting, to the impact table, an impact generated by driving a motor based on an impact waveform.

The impact test device 1 includes a dolly 20 (an impact table) on which a test piece W is placed, a dolly driver 30 that drives the dolly 20, a track unit 10 (a dolly track) that supports the dolly 20 and a later-described carriage 32 of the dolly driver 30 so as to be travelable in the X-axis direction, an impact generating device 40 (an impact waveform generating device) that generates an impact to be applied to the test piece W by a collision with the dolly 20 in the collision type test, and a fall preventing structure that prevents the test piece W from falling over.

The track unit 10 includes a roadbed 11 installed on the base 2 and extending in the X-axis direction, and a guideway-type circulation linear bearing (hereinafter referred to as a "linear guide") 12 installed on the roadbed 11. The track unit 10 of the present embodiment includes a plurality of set (e.g., three sets) of the roadbed 11 and linear guide 12 arranged for example at equal intervals in the left-right direction (i.e., in the Y-axis direction). It should be noted that a plurality of roadbed 11 may be integrally connected. For example, the track unit 10 may have a configuration in which a plurality of linear guide 12 are installed on a single roadbed 11.

Each linear guide 12 includes a rail 121 laid on an upper surface of the roadbed 11 (i.e., fixed to the base 2), and a plurality of (e.g., seven) runner 122 (FIG. 3) capable of traveling on the rail 121 via a plurality of rolling element. The rolling elements are held in the runners 122 and in a circulating path formed between the rail 121 and the runners 122. Some of the plurality of runner 122 (e.g., five runners 122) of each linear guide 12 are arranged for example at equal intervals in the X-axis direction and attached to a lower surface of the dolly 20. The remaining runners 122 (e.g., two runners 122) of each linear guide 12 are arranged for example at equal intervals in the X-axis direction and attached to a lower surface of the later-described carriage 32 of the dolly driver 30. The linear guide 12 guides movements of the dolly 20 and the carriage 32 in the X-axis direction. The carriage 32, the dolly 20, and the impact generating device 40 are arranged in this order in the X-axis direction.

The dolly driver 30 includes a carriage 32 that is capable of traveling on the track unit 10, and a carriage drive section that drives the carriage 32. The carriage drive section includes a drive module 34 that generates power for driving the carriage 32, and a belt mechanism 35 that transmits the power generated by the drive module 34 to the carriage 32.

The dolly driver 30 of the present embodiment includes four drive modules 34 (34FL, 34BL, 34FR, and 34BR) disposed near four corners of the base 2, respectively, and two sets of belt mechanisms 35 (35L and 35R) on the left and on the right, respectively. The belt mechanism 35L on the left is driven by a pair of drive modules 34FL and 34BL on the left, and the belt mechanism 35R on the right is driven by a pair of drive modules 34FR and 34BR on the right.

As shown in FIG. 3, the drive module 34 includes a frame 341, a servomotor 342, a belt mechanism 343, a shaft 344, and a plurality of bearing 345. The servomotor 342 is attached to an upper portion of the frame 341 with a shaft 342$b$ thereof oriented in the Y-axis direction. The shaft 344 is disposed below and parallel to the shaft 342$b$ of the servomotor 342, and is rotatably supported by the plurality of bearing 345 attached to the frame 341.

The belt mechanism 343 includes a drive pulley 343$a$ coupled to the shaft 342$b$ of the servomotor 342, a driven pulley 343$c$ coupled to the shaft 344, and a toothed belt 343$b$ wound around the drive pulley 343$a$ and the driven pulley 343$c$. Each of the drive pulley 343$a$ and the driven pulley 343$c$ is a toothed pulley having teeth adapted to the toothed belt 343$b$. In the present embodiment, since the number of teeth (i.e., a pitch diameter) of the driven pulley 343$c$ is larger than that of the drive pulley 343$a$, the belt mechanism 343 functions as a speed reducer and thus transmits torque output from the servomotor 342 to the shaft 344 while amplifying the torque.

The belt mechanism 35 includes a pair of drive pulleys 351, a toothed belt 352 wound around the pair of drive pulleys 351, and a belt clamp 353 (winding intermediate node fixing tool) for fixing the toothed belt 352 to the carriage 32. The drive pulleys 351 are coupled to the shafts 344 of the drive modules 34, respectively.

The toothed belt 352 and the toothed belt 343$b$ have cores of steel wires. It should be noted that toothed belts that have cores formed of so-called super fibers such as carbon fibers, aramid fibers, and ultra-high-molecular-weight polyethylene fibers may be used as the toothed belt 352 and the toothed belt 343$b$. By using a lightweight and high-strength core such as a carbon core, the carriage 32 and the dolly 20 can be driven at a large acceleration even when the servomotor 342 having a relatively low output is used, and thus the impact test device 1 can be downsized. Furthermore, in the case of using the servomotor 342 having the same output, by using the lightweight toothed belts 352 and 343$b$ having cores formed of the so-called super fiber, it is possible to apply an impact of a larger acceleration to the test piece W.

The pair of drive pulleys 351 of the belt mechanism 35L on the left are coupled to the shafts 344 of the pair of drive modules 34FL and 34BL on the left, respectively, and the pair of drive pulleys 351 of the belt mechanism 35R on the right are coupled to the shafts 344 of the pair of drive modules 34FR and 34BR, on the right, respectively.

The carriage 32 is releasably coupled to a rear end portion of the dolly 20 by coupling parts 321 (e.g., bolts, electromagnets, or the like). Specifically, the carriage 32 is integrally coupled to the dolly 20 when performing the non-collision type test, and is separated from the dolly 20 when performing the collision type test.

The dolly 20 includes a table 21 and a plastic programmer (hereinafter referred to as a "pad") 22 which is a first impact adjuster attached to a front surface of the table 21. The dolly 20 of the present embodiment includes four pads 22 arranged at equal intervals in the Y-axis direction.

As shown in FIG. 4, the impact generating device 40 includes a movable block 41, a track unit 42 (block tracks) that support the movable block 41 so as to be movable in the X-axis direction, pads 43 attached to a back surface (a surface facing the dolly 20) of the movable block 41, and two pairs of shock absorbers 44 and 45 disposed on left and right sides of the movable block 41. The shock absorbers 44 and 45 are, for example, hydraulic shock absorbers.

The track unit 42 includes a roadbed 421 installed on the base 2 and extending in the X-axis direction, and a linear guide 422 installed on the roadbed 421. The track unit 42 of the present embodiment includes a plurality of set (e.g., three sets) of the roadbed 421 and linear guide 422 arranged at equal intervals in the left-right direction. It should be noted that the plurality of roadbed 421 may be integrally coupled. For example, the track unit 42 may have a configuration in which a plurality of linear guide 422 are installed on a single roadbed 421.

Each linear guide 422 includes a rail 422*a* laid on an upper surface of the roadbed 421, and a plurality of (e.g., four) runner 422*b* capable of traveling on the rail 422*a*. The plurality of runner 422*b* are, for example, arranged at equal intervals in the X-axis direction, and are attached to a lower surface of the movable block 41. The linear guide 422 guides movement of the movable block 41 in the X-axis direction.

As shown in FIGS. 1 and 3, a pair of linear encoders 744 are provided on left and right sides of the dolly 20 at a central portion of a movable range of the dolly 20. Main bodies of the linear encoders 744 are attached to the roadbed 11. Scales 744*b* of the linear encoders 744 are attached to left and right sides of the dolly 20. A position and a speed of the dolly 20 are detected by the linear encoders 744.

The impact generating device 40 includes as many pads 43 as the pads 22 of the dolly 20, the pads 43 being a second impact adjuster. The pads 43 are paired with the pads 22 and attached to a back surface of the movable block 41 at positions facing the corresponding pads 22.

As shown in FIG. 4, a pair of push plates 411 having two flat surfaces (operating surfaces 411*a* and 411*b*) perpendicular to the X-axis protrude from left and right side surfaces of the movable block 41. The shock absorber 44 is disposed adjacent to a front surface of the push plate 411 with a piston rod 442 oriented toward the push plate 411. The shock absorber 45 is disposed adjacent to a back surface of the push plate 411 with a piston rod 452 oriented toward the push plate 411. A cylinder 441 of the shock absorber 44 and a cylinder 451 of the shock absorber 45 are fixed to the base 2. A distal end of the piston rod 442 abuts against the operating surface 411*a* formed on the front surface of the push plate 411, and a distal end of the piston rod 452 abuts against the operating surface 411*b* formed on the back surface of the push plate 411.

Movement of the movable block 41 in the X-axis positive direction is damped mainly by the shock absorber 44, and movement of the movable block 41 in the X-axis negative direction is damped mainly by the shock absorber 45. By using the pair of shock absorbers 44 and 45 disposed in opposite directions, it is possible to more efficiently damp impact (vibration) of the movable block 41.

In the present embodiment, hydraulic shock absorbers are used as the shock absorbers 44 and 45. However, pneumatic shock absorbers may be used instead of the hydraulic shock absorbers. Alternatively, the hydraulic shock absorber and the pneumatic shock absorber (or an elastic element such as an air spring or a coil spring) may be used by connecting them in series or in parallel. For example, as in a McPherson strut suspension of an automobile, a configuration may be adopted in which a shock absorber and a coil spring are coaxially disposed (i.e., the shock absorber is passed through a hollow portion of the coil spring) to connect the shock absorber and the coil spring in parallel.

In the collision type test, an impact is applied to the dolly 20 and the test piece W by causing the dolly 20 that is inertially traveling to collide with the impact generating device 40. At this time, the table 21 of the dolly 20 and the movable block 41 of the impact generating device 40 collide with each other via the pads 22 and 43. Furthermore, the vibration (impact) of the movable block 41 generated by the collision is absorbed and attenuated by the shock absorbers 44 and 45. Therefore, an impact waveform the impact generating device 40 applies to the test piece W changes depending on characteristics of the shock absorbers 44 and 45 (first shock absorbers) and the pads 22 and 43 (second shock absorbers). The characteristics of the shock absorbers 44 and 45 (the first shock absorbers) and the pads 22 and 43 (the second shock absorbers) are adjusted so that an impact having a desired waveform can be applied to the test piece W.

The fall preventing structure of the present embodiment includes a first support 50 (first section) installed on the base 2 independently of the dolly 20, and a second support 60 (second section) installed on the dolly 20.

The first support 50 includes a substantially gate-shaped support body 51, and a pair of track units 52 (support body track units) that support the support body 51. The support body 51 prevents the test piece W from falling over by coming into contact with the test piece W when the test piece W loses balance and tilts.

In the non-collision type test, a position at which the test piece W falls over (i.e., a position in the X-axis direction at which a large impact acts on the test piece W) changes depending on the test condition. Therefore, the first support 50 of the present embodiment is configured such that the position of the support body 51 in the X-axis direction can be changed.

As shown in FIG. 3, the support body 51 has a beam 513 (a connecting portion) extending in the left-right direction, a pair of legs 512 extending downward from left and right end portions of the beam 513, a pair of feet 51 extending forward from lower end portions of the respective legs 512, and two pairs of ribs 514 coupling the legs 512 and the feet 511 to each other. It should be noted that the beam 513 and the pair of legs 512 of the present embodiment are integrally formed by cutting out from a single flat plate. As shown in an enlarged view surrounded by a two dot dashed line in FIG. 3, a plurality of through holes 511*a* penetrating vertically are formed to the feet 511. For example, the plurality of through holes 511*a* are formed in a row at equal intervals in the X-axis direction.

A rectangular cutout portion 51*n* surrounded by the beam 513 and the pair of legs 512 is formed at a lower portion of the support body 51. A width (Y-axis dimension) and the height (Z-axis dimension) of the cutout portion 51*n* are larger than those of the dolly 20 so that the dolly 20 can pass through the cutout portion 51*n*. That is, in a state in which the test piece W is not placed on the dolly 20, it is possible to change an anteroposterior relationship (an arrangement order in the X-axis direction) between the dolly 20 and the support body 51.

As shown in FIG. 1, the pair of track units 52 are installed at left and right end portions of the base 2. As shown in an enlarged view in FIG. 3, the track unit 52 includes a guide rail 521, T-groove nuts 522, and bolts 523. The guide rail 521 is an elongated member (a so-called T-groove rail) to which a T-shaped groove extending in the X-axis direction is formed. A plurality of T-groove nuts 522 are fitted into the T-shaped groove of the guide rail 521.

The bolts 523 passed through the through holes 511*a* of the support body 51 are fitted into the T-groove nuts 522, whereby the support body 51 is releasably fixed to the track unit 52. That is, the track units 52 have a function as a fixing structure for fixing the support body 51 to the base 2.

When the bolts 523 are loosened, the fixing of the support body 51 to the track units 52 is released, and the support body 51 can move in the X-axis direction. At this time, since the bolts 523 are not removed from the T-groove nuts 522, the feet 511 of the support body 51 remain coupled to the T-groove nuts 522 via the bolts 523. Since the T-groove nuts 522 are fitted into the T-shaped groove, the T-groove nuts 522 (and the support body 51 coupled to the T-groove nuts 522) can move only in the X-axis direction which is the extending direction of the T-shaped groove. In other words, when the fixing of the support body 51 to the track units 52 is released, the track units 52 function as a guide that guides the movement of the support body 51 in the X-axis direction.

It should be noted that, in the present embodiment, the track units 52 are configured as a fixing and guide that functions as both a fixing structure that fixes the support body 51 to the base 2 and a guide that guides movement of the support body 51 in the X-axis direction (the traveling direction of the dolly 20). However, the fixing structure and the guide may be provided separately.

The second support 60 includes four post stands 62 installed near four corners on the table 21 of the dolly 20, four posts 64 (columnar supports) detachably held by the respective post stands 62, and a net 66 (a linear member) supported by the four posts 64. The post stands 62 are cylindrical members extending vertically, and lower portions of the posts 64 are inserted into hollow portions of the post stands 62.

The net 66 is formed in a box shape (rectangular parallelepiped shape) with an open side facing downward, covers four sets of the post 64 and the post stand 62, and is fixed to the post 64, the post stand 62, or the table 21 by a conventionally-known fixing member. The net 66 is formed for example of elastomer such as synthetic rubber and has stretchability. The posts 64 are for example installed so as to be lower than the test piece W. As a result, an upper portion of the test piece W comes into contact with the net 66 and is elastically and gently held by the net 66, whereby the test piece W is prevented from falling over.

By configuring the second support 60 from relatively thin members (or members formed by connecting thin members in a net-like fashion) such as the posts 64 and the net 66, and arranging these thin members at intervals (e.g., at intervals larger than the thickness of each member), it is possible to reduce a weight of the second support 60, and it is possible to reduce air resistance the second support 60 receives when the dolly 20 travels. This reduces the power required to drive the dolly 20 and makes it possible to reduce the capacity of the servomotor 342, and thus it becomes possible to reduce power consumption and size of the impact test device 1.

When the height of the test piece W is low, the posts 64 may not be used, and the net 66 may be fixed to the post stand 62 or the table 21.

In place of the net-like member such as the net 66, a string-like member such as a rubber string or a rope may be used as the linear member, and in place of the elastomer, a linear member formed of a material having normal elasticity (energy elasticity) such as polypropylene or steel may be used.

A configuration may be adopted in which a linear member that does not have elasticity is used and a fixing member that elastically fixes the linear member to the post 64 or the dolly 20 is used.

Figure 6A:
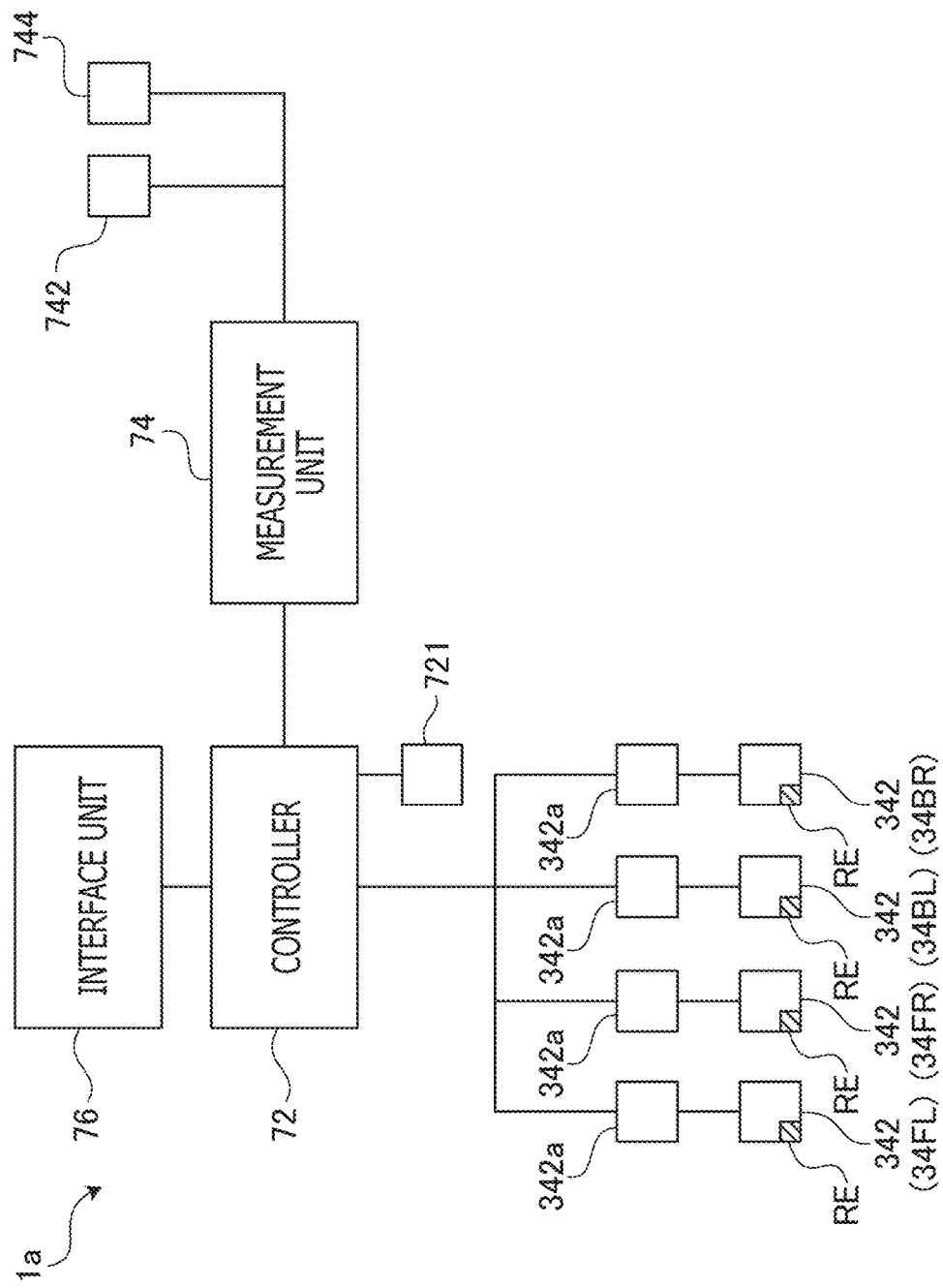
FIGS. 6(a) and 6(b) are block diagrams showing schematic configurations of a control system of an impact test device according to illustrative embodiments of the present disclosure.

FIG. 6(a) is a block diagram illustrating a schematic configuration of a control system 1a of the impact test device 1. The control system 1a includes a controller 72 that controls operation of the entire device, a measurement unit 74 that performs various measurements, and an interface unit 76 that performs input and output with the outside.

The servomotor 342 of each drive module 34 is connected to the controller 72 via a servo amplifier 342a. A rotary encoder RE is built in the servomotor 342. Phase information of the shaft 342b of the servomotor 342 detected by the rotary encoder RE is input to the controller 72 via the servo amplifier 342a.

The controller 72 and each servo amplifier 342a are communicably connected to each other with an optical fiber, and high-speed feedback control can be performed between the controller 72 and each servo amplifier 342a. Accordingly, it is possible to synchronously control the plurality of servomotors 342 with higher accuracy (specifically, with high resolution and high accuracy in the time axis).

The interface unit 76 includes, for example, one or more of a user interface for performing input from and output to a user, network interfaces for connecting to various networks such as a LAN (Local Area Network), and various communication interfaces for connecting to external devices such as USB (Universal Serial Bus) and GPIB (General Purpose Interface Bus). The user interface includes one or more of various input/output devices such as, for example, various operation switches, indicators, various display devices such as an LCD (Liquid Crystal Display), various pointing devices such as a mouse and touch pad, a touch screen, a video camera, a printer, a scanner, a buzzer, a speaker, a microphone and a memory card reader/writer.

The measurement unit 74 includes an acceleration sensor 742 and a linear encoder 744 attached to the dolly 20. The measurement unit 74 generates measurement data by amplifying and digitally converting signals from the acceleration sensor 742 and the linear encoder 744, and transmits the measurement data to the controller 72. An acceleration sensor 742 to be attached to the test piece W can further be added to the measurement unit 74 to measure an impact acting on the test piece W during the test.

The controller 72 synchronously controls driving of the servomotors 342 of the drive modules 34 on the basis of control conditions such as impact waveforms (e.g., acceleration waveforms) input through the interface unit 76 and measurement data input from the measurement unit 74. In the present embodiment, two servomotors 342 are driven in the same phase (precisely, the servomotors 342 of the drive modules 34FL and 34BL on the left and the servomotors 342 of the drive modules 34FR and 34BR on the right are driven in opposite phases (in opposite rotating direction)).

As described above, the impact test device 1 according to the present embodiment can be used to perform two types of tests, namely, the collision type test and the non-collision type test. Hereinafter, a content of and a procedure for each test will be described.

[Collision Type Test]

The collision type test is performed in a state in which the connection between the dolly 20 and the carriage 32 of the dolly driver 30 is released. In the collision type test, a force that causes the test piece W to fall over forward acts on the test piece W when the dolly 20 collides with the impact generating device 40. Therefore, in a case where the first support 50 is used, for example, as shown in FIG. 1, the support body 51 (more specifically, the beam 513) of the first support 50 is installed in the vicinity of the rear end portion of the impact generating device 40 (i.e., the pads 43). The position of the support body 51 of the first support 50 is appropriately adjusted in accordance with a size, shape, weight distribution, and the like of the test piece W.

In the collision type test, first, for example, the carriage 32 is moved to a start position S set in the vicinity of a rear end of a travelable range (the movable range of the dolly 20 in the X-axis direction) by driving the drive module 34. Then, the dolly 20 is moved, for example, manually, to a position where the dolly 20 contacts with the carriage 32, and the test piece W is placed on the table 21 of the dolly 20. When the second support 60 is used, the test piece W is held on the table 21 by the second support 60.

When loading of the test piece W on the dolly 20 is completed and a command to start a test is issued through a user operation on, for example, a touch screen (the interface unit 76) or the like, continuous measurement of an impact by the acceleration sensor 742 mounted on the dolly 20 starts. Detection results by the acceleration sensor 742 are accumulated and stored in a storage 721 connected to the controller 72, is graphed, and is displayed on a display device (the interface unit 76) as an impact waveform (e.g., an acceleration waveform).

Then, the carriage 32 is gradually accelerated forward by the driving of the drive module 34. At this time, the dolly 20 is pushed by the carriage 32 to travel at the same speed as the carriage 32. When the carriage 32 reaches a preset collision speed, the carriage 32 is decelerated. As the carriage 32 decelerates, the dolly 20 moves away from the carriage 32, inertially travels at the collision speed, and finally collides with the impact generating device 40.

In the collision type test, the impact generated by the collision between the dolly 20 and the impact generating device 40 acts on the test piece W placed on the dolly 20. By the collision, a force to tilt the test piece W forward acts on the test piece W. Therefore, the test piece W tilts forward, but the test piece W is prevented from falling over since the test piece W contacts the support body 51 of the first support 50 disposed in the vicinity of the front end of the dolly 20.

When a predetermined time elapses after the collision, the measurement by the acceleration sensor 742 stops, the test piece W is taken out of the dolly 20, thereby one collision type test ends.

[Non-Collision Type Test]

The non-collision type test is performed in a state in which the carriage 32 and the dolly 20 are integrally coupled by the coupling parts 321.

In the non-collision type test, a position where the test piece W is expected to fall over (an expected falling position) changes depending on test conditions (a shock waveform or the like). When using the first support 50, the support body 51 of the first support 50 is installed in the vicinity of the expected falling position.

Then, the dolly 20 coupled to the carriage 32 is moved to a start position by the drive of the drive module 34. The start position of the non-collision type test may be set to a position different from the start position S of the collision type test (e.g., in the vicinity of a center of the travelable range of the dolly 20). At the start position, the test piece W is placed on the table 21 of the dolly 20. When the second support 60 is used, the test piece W is held on the table 21 by the second support 60.

When loading of the test piece W on the dolly 20 is completed and a command to start a test is issued through the user operation on the interface unit 76, continuous measurement of an impact by the acceleration sensor 742 mounted on the dolly 20 starts.

Then, driving of the servomotor 342 of each drive module 34 is controlled on the basis of waveform data of a preset impact waveform (e.g., an acceleration waveform). An impact generated by each drive module 34 is transmitted to the carriage 32 and the dolly 20 by the belt mechanism 35 and is applied to the test piece W placed on the dolly 20.

Since, for example, a force to tilt the test piece W forward acts on the test piece W due to the impact applied to the test piece W, the test piece W tilts forward. However, since the test piece W comes into contact with the support body 51 of the first support 50 disposed in the vicinity of the front end of the dolly 20, the test piece W is prevented from falling over.

When a predetermined time elapses after the application of the impact to the test piece W, the measurement by the acceleration sensor 742 stops, the test piece W is taken out of the dolly 20, thereby one non-collision type test ends.

Second Embodiment

Next, a second embodiment of the present disclosure will be described. An impact test device 2000 according to the second embodiment is a device in which the first support is made automatically movable. Hereinafter, mainly aspects of the second embodiment which are different from the first embodiment will be described, and redundant description of configurations common to the first embodiment will be omitted.

Figure 7:
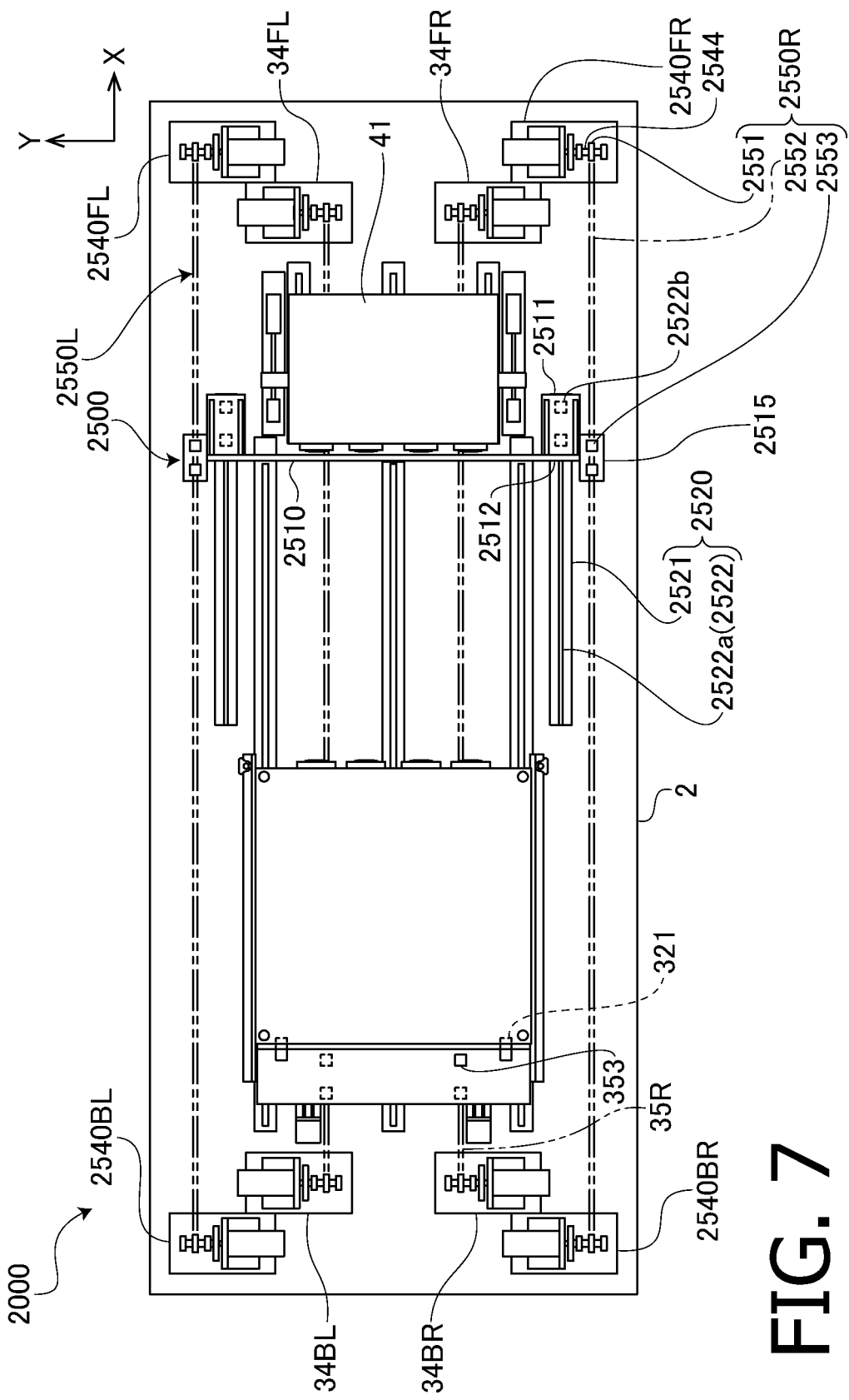
FIG. 7 is a plan view of an impact test device according to a second embodiment of the present disclosure.

FIG. 7 is a plan view of the impact test device 2000 according to the second embodiment of the present disclosure. A first support 2500 of the impact test device 2000 includes a support body 2510, a track unit 2520 that supports the support body 2510 so as to be movable in the X-axis direction, and a support body driver that drives the support body 2510. The support body driver includes four drive modules 2540FL, 2540FR, 2540BL, and 2540BR (hereinafter collectively referred to as "drive modules 2540" as appropriate and each referred to as "drive module 2540" without discrimination as appropriate) that generate power for driving the support body 2510, and two sets of belt mechanisms 2550R and 2550L on the left and right (hereinafter collectively referred to as "belt mechanisms 2550" as appropriate and each referred to as "belt mechanism 2550" without discrimination as appropriate) that transmit the power generated by the drive modules 2540 to the support body 2510. The support body 2510 is driven in the X-axis direction by the power generated by the drive modules 2540.

The four drive modules 2540 are disposed near four corners of the base 2, respectively. The belt mechanism 2550L on the left is driven by the pair of drive modules 2540FL and 2540BL on the left, and the belt mechanism 2550R on the right is driven by the pair of drive modules 2540FR and 2540BR on the right. The configuration of the drive module 2540 is the same as the configuration of the drive module 34 of the first embodiment, and thus the description thereof will be omitted.

The track unit 2520 includes a pair of roadbeds 2521 installed on the base 2 and extending in the X-axis direction, and a pair of linear guides 2522 provided on the roadbeds 2521, respectively. Each linear guide 2522 includes a rail 2522a laid on an upper surface of the roadbed 2521, and a plurality of (e.g., two) runner 2522b capable of traveling on the rail 2522a. The runners 2522b are attached to a lower surface of leg portions 2511 of the support body 2510. The linear guide 2522 guides the movement of the support body 2510 in the X-axis direction.

Each belt mechanism 2550 includes a pair of drive pulleys 2551, a toothed belt 2552 wound around the pair of drive pulleys 2551, and a belt clamp 2553 (winding intermediate fixing tool) that fixes the toothed belt 2552 to the support body 2510. The drive pulleys 2551 are coupled to shafts 2544 of respective drive modules 2540. The support body 2510 is provided with horizontally disposed flat plate-shaped clamp attachment parts 2515 protruding outward to the left and right from respective legs 2512. The toothed belts 2552 are attached to the respective clamp attachment parts 2515 by belt clamps 2553. The support body 2510 is driven forward and backward (in the X-axis direction) by the power transmitted by the drive module 2540.

Figure 6B:
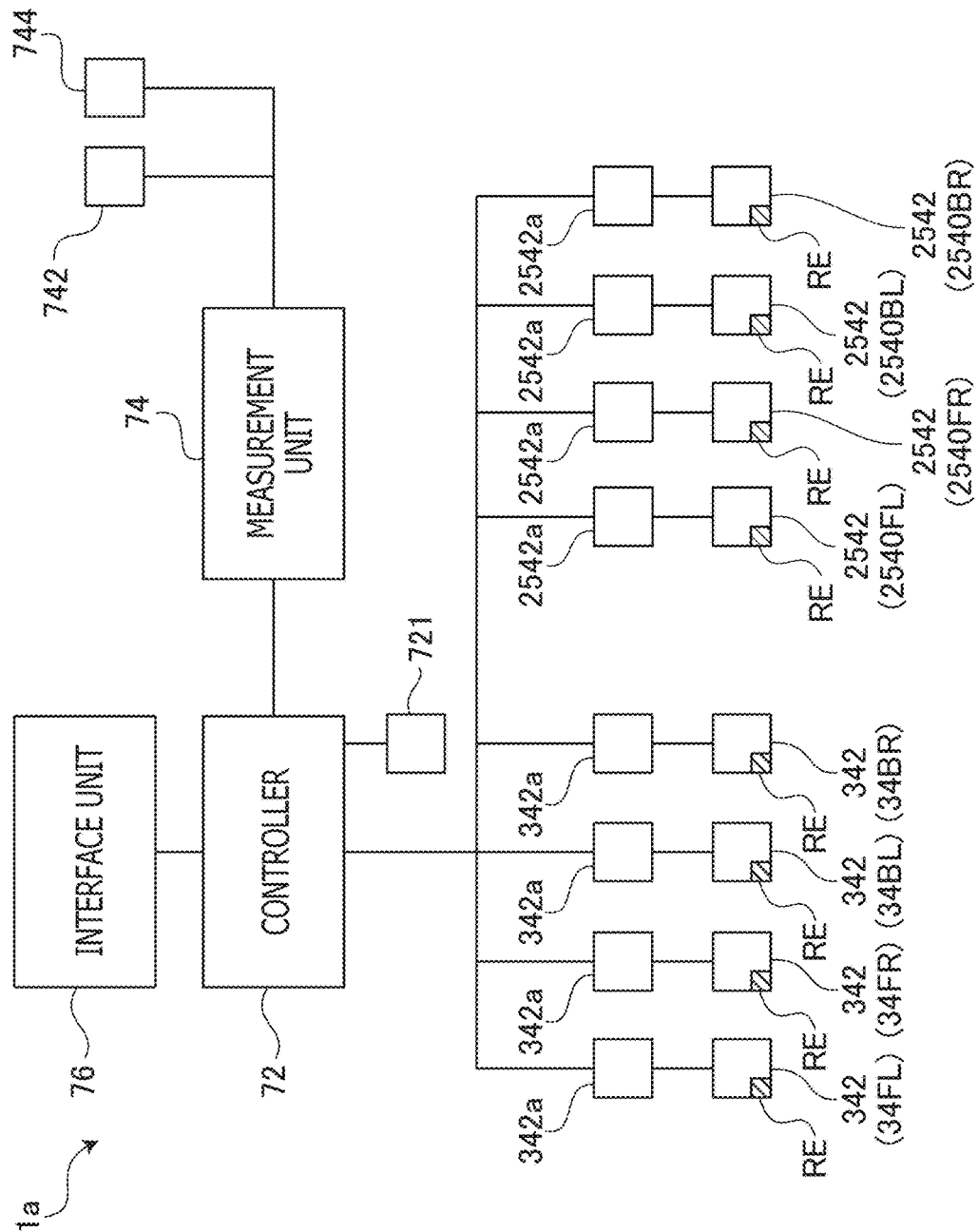

As shown in FIG. 6(b), a servomotor 2542 of each drive module 2540 is connected to the controller 72 via a servo amplifier 2542a. A rotary encoder RE is built in the servomotor 2542. Phase information of a shaft of the servomotor 2542 detected by the rotary encoder RE is input to the controller 72 via the servo amplifier 2542a.

Hereinafter, two examples related to drive control of the support body 2510 of the first support 2500 of the impact test device 2000 according to the second embodiment of the present disclosure will be described.

Example 1

In Example 1, the movement and fixing of the support body 2510 of the first support 50 which are manually performed in the first embodiment are automated. Specifically, before starting the impact test (e.g., before placing the test piece W on the dolly 20), the controller 72 synchronously controls the four drive modules 2540 (the servomotors 2542) of the support body driver to move the support body 2510 to a predetermined position (support body installation position) set in accordance with the test condition.

In the collision type test, the support body installation position is set, for example, at a position adjacent to the front of the dolly 20 disposed at a foremost end of a range in which the dolly 20 travels during the test (i.e., in the vicinity of the rear end portion of the impact generating device 40). In the non-collision type test, the support body installation position is set, for example, at a position adjacent to the front of the dolly 20 disposed at the foremost end of the range in which the dolly 20 travels during the test or at a position adjacent to the rear of the dolly 20 disposed at a rearmost end of the range in which the dolly 20 travels during the test. For example, when a sign of a maximum acceleration of an impact waveform (or an integral value of the acceleration) is positive (i.e., when a forward impact is to be applied), the support body installation position is set forward of the travel range of the dolly 20, and when the sign is negative (i.e., when a rearward impact is to be applied), the support body installation position is set rearward of the travel range of the dolly 20.

In Example 1, during the test, the support body 2510 is not driven but is held at the support installation position. In other words, the support body driver functions as a fixing structure that releasably fixes the support body 2510 to the base 2 during the test.

Example 2

In Example 2, during the test, the support body 2510 is not kept still, and the dolly 20 and the support body 2510 are driven while keeping a distance between the dolly 20 and the support body 2510 substantially constant. Specifically, the controller 72 synchronously controls the four drive modules 34 (specifically, the servomotors 342) of the carriage drive section and the four drive modules 2540 (specifically, the servomotors 2542) of the support body driver on the basis of an impact waveform.

The driving of the four drive modules 2540 of the support body driver may be controlled on the basis of an impact waveform subjected to smoothing processing (e.g., simple moving average). By controlling the driving on the basis of the impact waveform subjected to smoothing processing, acceleration acting on the support body 2510 is alleviated, and power consumption of the servomotor 2542 is reduced.

According to the illustrative embodiments of the present disclosure described above, since the first supports 50 and 2500 are separated from the dolly 20, the increase in the weight of the dolly 20 and the air resistance during traveling due to the introduction of the fall preventing structure is reduced, and the increase in the power required to drive the dolly 20 is reduced. Therefore, it is possible to drive the dolly 20 by using a motor of a smaller capacity. In addition, since degradation in traveling characteristics (e.g., accuracy and stability of a traveling speed) and a change in impact characteristics (e.g., an impact waveform to be applied to the test piece W) of the dolly 20 due to the introduction of the fall preventing structure are reduced, degradation in the test accuracy can be suppressed. Furthermore, in the non-collision type test, a larger impact (acceleration) can be applied to the test piece W by suppressing the increase in the weight of the dolly (impact table) and the air resistance.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For example, appropriate combinations of configurations of embodiments and the like explicitly illustrated in this specification and/or configurations that are obvious to a person with ordinary skills in the art from the description of this specification are also included in the embodiments of this application. As further examples, according to aspects of the present disclosure, the following modifications are possible.

In each of the embodiments described above, the dolly 20 and the carriage 32 are separated from each other so that both the collision type test and the non-collision type test can be performed. However, the dolly 20 and the carriage 32 may be integrated to form a device dedicated to the non-collision type test.

In the above-described embodiments, the fall preventing structure includes both the first support 50 (the first support 2500) and the second support 60. However, the fall preventing structure may include only one of the first support and the second support.

In each of the above-described embodiments, the toothed belt 352 is wound around the pair of drive pulleys 351. However, one of the pulleys around which the toothed belt 352 is wound may be a driven pulley. In this case, one of the drive modules 34FL (34FR) and 34BL (34BR) is not necessary. Such configuration can also be applied to the belt mechanism 2550 of the support body driver.

In each of the above-described embodiments, the carriage 32 is driven by the two toothed belts 352. However, the carriage 32 may be driven by one or three or more toothed belts 352. Such configuration can also be applied to the support body driver.

Figure 8:
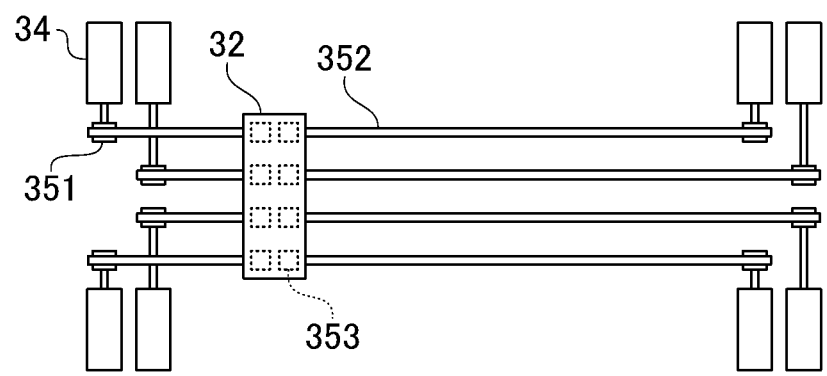
FIG. 8 is a diagram showing a schematic configuration of a modified example of a dolly driver.

FIG. 8 is a plan view schematically showing an exemplary configuration in which the carriage 32 is driven by four toothed belts 352. As shown in FIG. 8, lengths (number of teeth) of the respective toothed belts 352 may be made the same. By making the lengths of the toothed belts 352 the same, transmission characteristics of the plurality of toothed belts 352 become uniform, and thus the carriage 32 can be driven more stably. Such configuration can also be applied to the belt mechanism 2550 of the support body driver. Furthermore, by arranging the adjacent drive modules 34 in the front-rear direction (i.e., by shifting positions of the adjacent drive modules 34 with respect to each other in the font-rear direction), it is possible to make the impact test device compact.

The pitch diameters (the number of teeth) of the respective drive pulleys 351 may be made the same. Reduction ratios of the belt mechanisms 343 built in the respective drive modules 34 may also be made the same. With such configuration, since ratios of driving amounts of the respective servomotors 342 (rotation angles of the respective shafts 342*b*) to moving amounts of the respective toothed belts 352 become the same, the servomotors 342 can be driven with the same driving amounts. These configurations can also be applied to the support body driver.

Figure 9:
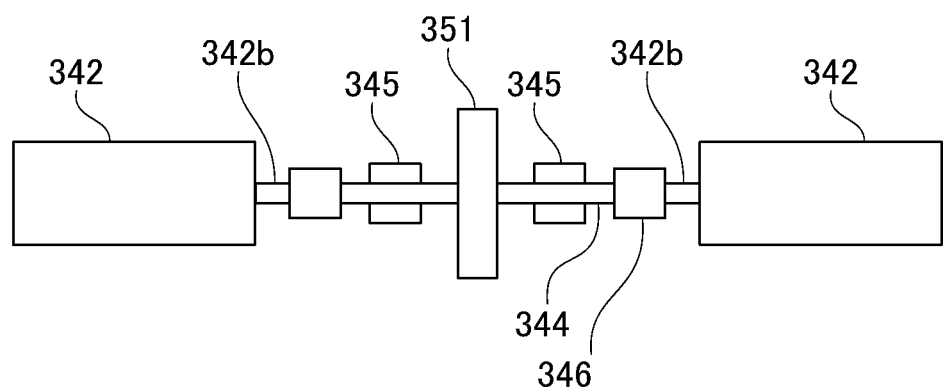
FIG. 9 is a diagram showing a schematic configuration of a modified example of a drive module.

FIG. 9 is a diagram showing a schematic configuration of a modified example of the drive module 34. As shown in FIG. 9, the drive module 34 may include a plurality of (for example, two) servomotor 342. In the modified example shown in FIG. 9, the shafts 342*b* of a pair of servomotors 342 are connected to both ends of a shaft 344 by couplings 346, respectively. Thereby, one drive pulley 351 can be driven by the pair of servomotors 342. A configuration in which a plurality of drive pulley 351 (belt mechanism 35) are coupled to one shaft 344 may also be adopted. With this configuration, it is possible to change ratio of the servomotors 342 to the drive pulleys 351 coupled to the shaft 344, and thus it is possible to effectively make use of performances of the servomotor 342 and the toothed belt 352.

In the above-described embodiment, a linear member having rubber elasticity is used. However, for example, a linear member formed of a highly elastic material such as polyamide-based resin or steel may be used.

What is claimed is:

1. An impact test device comprising:
 a controller;
 a dolly configured to travel with a test piece placed thereon;
 a dolly driver configured to drive the dolly;
 an impact generating device configured to collide with the dolly to generate an impact to be applied to the test piece; and
 a fall preventing structure configured to prevent the test piece from falling over, wherein
 the fall preventing structure includes a first section independent of the dolly,
 the first section is movable in a traveling direction of the dolly,
 the first section comprises:
  a support body configured to support the test piece when the test piece tilts to prevent the test piece from falling over,
  a guide configured to guide movement of the support body in the traveling direction,
  a support body driver configured to drive the support body in the traveling direction,
 the impact test device is configured to perform:
  a collision type test in which the impact is applied to the test piece by causing the dolly on which the test piece is placed to collide with the impact generating device, and
  a non-collision type test in which an impact waveform is applied to the test piece by transmitting the impact waveform, which is generated by driving the dolly driver, to the dolly, and
 the controller is configured to:
  control the support body driver and the dolly driver,
  move the support body to a predetermined position set in accordance with a test condition,
  control the dolly driver to cause the dolly to collide with the impact generating device at a predetermined speed in the collision type test, and
  control the dolly driver so that the dolly is driven based on the impact waveform in the non-collision type test.

2. The impact test device according to claim 1, comprising a base on which the first section is installed, wherein the first section includes a fixing structure configured to releasably fix the support body to the base.

3. The impact test device according to claim 2, wherein the first section includes a fixing and guide serving as both the guide and the fixing structure, the fixing and guide comprising:
 a T-shaped groove fixed to the base and extending in the traveling direction;
 a T-groove nut fitted into the T-shaped groove; and
 a bolt that is inserted in a through hole formed to the support body and fitted into the T-groove nut, thereby fixing the support body to the T-shaped groove.

4. The impact test device according to claim 1, wherein the support body driver comprises:
 a drive module configured to generate power for driving the support body; and
 a belt mechanism configured to transmit the power generated by the drive module to the support body.

5. The impact test device according to claim 1, wherein the dolly driver includes:
 a carriage releasably coupled to the dolly; and
 a dolly track configured to travellably support the dolly and the carriage,
 in the non-collision type test, the carriage is coupled to the dolly, and
 in the collision type test, connection between the carriage and the dolly is released.

6. The impact test device according to claim 1, wherein the impact generating device comprises:
 a movable block;
 a first plastic programmer attached to a surface of the movable block facing the dolly;
 a block track configured to support the movable block so as to be movable in the traveling direction; and
 a shock absorber configured to absorb vibration of the movable block,
 the block track includes a linear guide,
 the linear guide comprises:
  a rail; and
  a runner attached to the movable block and capable of traveling on the rail via rolling elements, and
 the dolly comprises a second plastic programmer attached to a surface facing the movable block.

7. The impact test device according to claim 1, wherein the fall preventing structure includes a second section installed on the dolly, and the second section comprises:
   a plurality of columnar support erected on the dolly; and
   a linear member stretched over the plurality of columnar support.

8. The impact test device according to claim 7,
wherein the linear member includes one of a string-like member having a string shape and a net-like member having a net shape.

* * * * *

UNITED STATES PATENT AND TRADEMARK OFFICE
CERTIFICATE OF CORRECTION

| | | |
|---|---|---|
| PATENT NO. | : 12,385,817 B2 | Page 1 of 1 |
| APPLICATION NO. | : 17/836680 | |
| DATED | : August 12, 2025 | |
| INVENTOR(S) | : Sigeru Matsumoto et al. | |

It is certified that error appears in the above-identified patent and that said Letters Patent is hereby corrected as shown below:

On the Title Page

Page 2 item (56) "JP H107-215246 A 8/1995" should read –JP H07-215246 A 8/1995–.

Signed and Sealed this
Seventh Day of October, 2025

John A. Squires
*Director of the United States Patent and Trademark Office*